United States Patent
Ayoub

(10) Patent No.: US 10,275,375 B2
(45) Date of Patent: Apr. 30, 2019

(54) NETWORK INTERFACE CONTROLLER WITH COMPRESSION CAPABILITIES

(71) Applicant: MELLANOX TECHNOLOGIES LTD., Yokneam (IL)

(72) Inventor: Ali Ayoub, Santa Clara, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 660 days.

(21) Appl. No.: 13/792,083

(22) Filed: Mar. 10, 2013

(65) Prior Publication Data

US 2014/0258438 A1   Sep. 11, 2014

(51) Int. Cl.
*G06F 13/28* (2006.01)

(52) U.S. Cl.
CPC ..................... *G06F 13/28* (2013.01)

(58) Field of Classification Search
CPC ....................................................... H04L 69/04
See application file for complete search history.

(56) References Cited

U.S. PATENT DOCUMENTS

| | | | | |
|---|---|---|---|---|
| 6,385,670 B1* | 5/2002 | Spilo | ............ | G06F 13/28 370/507 |
| 6,449,658 B1* | 9/2002 | Lafe | ............ | H04L 29/06 709/203 |
| 6,625,671 B1* | 9/2003 | Collette | ............ | G06F 13/4059 710/20 |
| 6,775,693 B1* | 8/2004 | Adams | ............ | G06F 13/28 709/213 |
| 7,051,126 B1 | 5/2006 | Franklin | | |
| 7,089,391 B2* | 8/2006 | Geiger | ............ | G06F 12/08 709/247 |
| 7,558,873 B1* | 7/2009 | Maufer | ............ | H04L 63/164 709/203 |
| 7,835,380 B1 | 11/2010 | Aloni et al. | | |
| 7,955,264 B2 | 6/2011 | Mathew et al. | | |
| 8,018,961 B2* | 9/2011 | Gopinath | ............ | H04L 49/901 370/412 |
| 2005/0108518 A1 | 5/2005 | Pandya | | |
| 2007/0098280 A1 | 5/2007 | Akarmann | | |
| 2008/0091789 A1 | 4/2008 | Kimiyama et al. | | |
| 2008/0109573 A1* | 5/2008 | Leonard | ............ | G06F 13/28 710/24 |
| 2008/0313364 A1 | 12/2008 | Flynn et al. | | |
| 2009/0089454 A1* | 4/2009 | Huggahalli et al. | ............ | 709/247 |

(Continued)

OTHER PUBLICATIONS

Shanley, Tom. InfiniBand Network Architecture. Boston: Addison-Wesley Professional, 2002. Ch.1 pp. 6-16, Ch. 3 pp. 21-40, Ch. 5, pp. 52-70 (attached as 3 pdf files).*

(Continued)

*Primary Examiner* — Davoud A Zand
*Assistant Examiner* — Albert Chiou
(74) *Attorney, Agent, or Firm* — Kligler & Associates

(57) ABSTRACT

A method for communication includes receiving in a network interface controller (NIC) from a host processor, which has a local host memory and is connected to the NIC by a local bus, a remote direct memory access (RDMA) compress-and-write command, specifying a source memory buffer in the local host memory and a target memory address. In response to the command, data are read from the specified buffer into the NIC, compressed in the NIC, and conveyed from the NIC to the target memory address.

17 Claims, 2 Drawing Sheets

(56) References Cited

U.S. PATENT DOCUMENTS

2010/0070650 A1    3/2010   MacGaffey et al.
2012/0198284 A1    8/2012   Li
2013/0262538 A1*  10/2013   Wegener .............. H03M 7/30
                                                              708/203

OTHER PUBLICATIONS

Manolis Marazakis et al. 2006. Efficient remote block-level I/O over an RDMA-capable NIC. In Proceedings of the 20th annual international conference on Supercomputing (ICS '06). ACM, New York, NY, USA, 97-106. DOI=http://dx.doi.org/10.1145/1183401.1183417 (Year: 2006).*

* cited by examiner

NETWORK INTERFACE CONTROLLER WITH COMPRESSION CAPABILITIES

FIELD OF THE INVENTION

The present invention relates generally to computer networks, and particularly to network interface controllers that are used to connect host computers to such networks.

BACKGROUND

Switched-fabric communication architectures are widely used in high-performance computing. Examples of such architectures include InfiniBand™ and high-speed Ethernet™. Computing devices (host processors and peripherals) connect to the switched fabric via a network interface controller (NIC), which is referred to in InfiniBand (IB) parlance as a channel adapter. Host processors (or hosts) use a host channel adapter (HCA), while peripheral devices use a target channel adapter (TCA). Some of the embodiments in the description that follows are based on features of the IB architecture and use vocabulary taken from IB specifications. Similar mechanisms exist in networks and input/output (I/O) devices that operate in accordance with other protocols, such as Ethernet and Fibre Channel, however, and IB terminology and features are used herein by way of example, for the sake of convenience and clarity, and not by way of limitation.

Client processes (referred to hereinafter as clients), such as software application processes, running on a host processor communicate with the transport layer of an IB fabric by manipulating a transport service instance, known as a "queue pair" (QP). Each QP is made up of a send work queue and a receive work queue. To send and receive messages over the network using a HCA, the client submits work items, called work queue elements (WQEs), for execution by the HCA. (More precisely, the client initiates work requests (WRs), which cause WQEs to be placed in the appropriate work queues.) After it has finished servicing a WQE, the HCA typically writes a completion report, in the form of a completion queue element (CQE), to a completion queue, to be read by the client as an indication that the work request has been executed.

Remote direct memory access (RDMA) protocols enable a NIC to carry out direct memory access operations over a network from the memory of one computer to another without directly involving the computer operating systems. For example, an RDMA write command specifies a source buffer in the local host memory and instructs the NIC to transfer the data in the buffer, via one or more packets sent over the network, to a target address in the host memory of a (remote) target node. The NIC at the target node receives the packets and writes the data to the target address. In similar fashion, an RDMA read command specifies a source buffer in a remote node and causes the NIC to request the data in the source buffer and then, upon receiving the data from the remote node, to write the data to a target address in the local host memory.

In IB networks, RDMA read and write operations are an integral part of the transport-layer protocol. These operations provide high-throughput, low-latency data transfers, which are carried out by the HCA under application-level control. RDMA over Converged Ethernet (RoCE) and the Internet Wide Area RDMA Protocol (iWARP) offer similar capabilities over an Ethernet network.

SUMMARY

Embodiments of the present invention provide I/O devices with enhanced capabilities and methods that exploit such capabilities.

There is therefore provided, in accordance with an embodiment of the present invention, a method for communication, which includes receiving in a network interface controller (NIC) from a host processor, which has a local host memory and is connected to the NIC by a local bus, a remote direct memory access (RDMA) compress-and-write command, specifying a source memory buffer in the local host memory and a target memory address. In response to the command, data are read from the specified buffer into the NIC, the data are compressed in the NIC, and the compressed data are conveyed from the NIC to the target memory address.

In some embodiments, the target memory address is in a remote host memory of a target network node, and conveying the data includes transmitting the compressed data in one or more data packets from the NIC over a network to the target network node. The method typically includes receiving the data packets in a remote NIC of the target network node, and writing the compressed data, by the remote NIC responsively to a header of the one or more data packets, to the target memory address in the remote host memory. The method may also include receiving in the remote NIC, from a remote host processor in the target network node, an RDMA read-and-decompress command, specifying a compressed buffer located at the target memory address and a further buffer for decompressed data in the remote host memory. In response to the RDMA read-and-decompress command, the compressed data are read from the compressed buffer into the remote NIC and decompressed in the remote NIC, and the decompressed data are written from the remote NIC to the further buffer.

Alternatively, the target memory address may be in the local host memory of the host processor.

Typically, receiving the RDMA compress-and-write command includes processing a work item submitted by a client process running on the host processor.

There is also provided, in accordance with an embodiment of the present invention, a method for communication, which includes receiving in a network interface controller (NIC) from a host processor a remote direct memory access (RDMA) read-and-decompress command, specifying a source memory buffer containing compressed data and a target memory address in the local host memory. In response to the command, the compressed data are read from the specified buffer into the NIC and are decompressed in the NIC, and the decompressed data are conveyed from the NIC to the target memory address in the local host memory.

In one embodiment, the source memory buffer is in the local host memory of the host processor.

In another embodiment, the source memory buffer is in a remote host memory of a remote network node, and reading the compressed data includes receiving the compressed data in the NIC in one or more data packets transmitted over a network from the remote network node.

Typically, receiving the RDMA read-and-decompress command includes processing a work item submitted by a client process running on the host processor.

There is additionally provided, in accordance with an embodiment of the present invention, a network interface controller (NIC), which includes a network interface, configured to transmit and receive data packets over a network, and a host interface, configured to be connected via a local bus to a host processor and a local host memory of the host processor. Processing circuitry is coupled between the network interface and the host interface and is configured to receive, via the host interface, a remote direct memory access (RDMA) compress-and-write command, specifying a source memory buffer in the local host memory and a target memory address, and in response to the command, to read data from the specified buffer, to compress the data, and to convey the compressed data to the target memory address.

The present invention will be more fully understood from the following detailed description of the embodiments thereof, taken together with the drawings in which:

DETAILED DESCRIPTION OF EMBODIMENTS

In many situations, data are compressed prior to transmission over a network in order to conserve bandwidth. Data may likewise be stored in memory in compressed form and then decompressed before use by a host processor. Data compression and decompression, however, are computation-intensive tasks, which consume considerable processing resources when carried out in software. Although dedicated hardware-based compression co-processors are known in the art, they are not available in most servers.

Embodiments of the present invention that are described hereinbelow overcome these limitations by providing a NIC with compression and decompression capabilities, along with a set of RDMA commands that a client process, running on a host processor, can use to invoke these capabilities. One of these commands is an RDMA compress-and-write command, specifying a source buffer in the local host memory of the host processor, as well as a target address. In response to such a command, the NIC reads data from the specified buffer, compresses the data, and then conveys the compressed data to the target address. Concomitantly, an RDMA read-and-decompress command causes the NIC to read compressed data from a specified buffer, decompress the data, and then write the decompressed data to a target address. These operations—both RDMA and compression/decompression—are typically performed by the NIC as "zero-copy" operations, i.e., on the fly, without storing the data in the NIC or at any other intermediate point between the source buffer and the target address.

The host processor is thus able to offload not only communication tasks, but also compression tasks, to the NIC. In a typical model of use of these RDMA commands, the RDMA compress-and-write command specifies data in a buffer in the local host memory to be written in compressed form via the network to a target address on a remote node. Alternatively, however, the commands may be applied locally. Thus, for example, after receiving a buffer of compressed data in the local host memory, the host processor may invoke the RDMA read-and-decompress command to cause the NIC to decompress and then write the data to a local target address, also in the local host memory, without actual network transmission. (By the same token, to conserve storage space, the host processor may leave the data in compressed form until decompression is actually needed.) NICs in accordance with embodiments of the present invention are thus particularly useful in applications that are communication- and compression-intensive.

Figure 1:
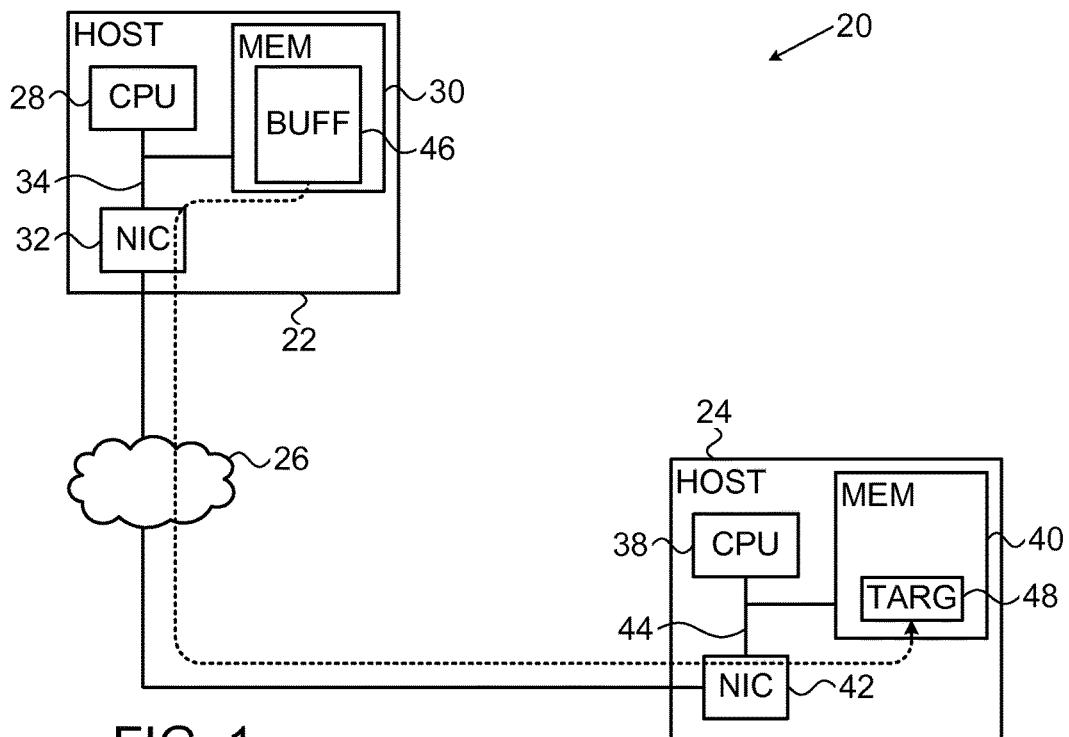
FIG. 1 is a block diagram that schematically illustrates a network communication system, in accordance with an embodiment of the present invention.

FIG. 1 is a block diagram that schematically illustrates a network communication system 20, in accordance with an embodiment of the present invention. A host computer 22 (also referred to as a host or a host device) communicates with another host 24 via a network 26, such as an IB or Ethernet switch fabric in the present example. Hosts 22 and 24 can also be seen as nodes on network 26. Host 22 comprises a central processing unit (CPU) 28 (also referred to simply as a processor) and a system memory 30 (also referred to as a local host memory), which are connected by a suitable local bus 34. A NIC 32, such as an HCA, connects host 22 to network 26 (although as noted earlier and explained further hereinbelow, the NIC may also be used for local compression and decompression operations). NIC 32 is connected to the other components of host 22 by bus 34, which may be a peripheral connection bus, such as a PCI Express™ (PCIe) bus, or it may be an internal system bus of CPU 28, depending on the architecture of the computer. Similarly, host 24 comprises a CPU 38, memory 40 and NIC 42, connected by a bus 44.

In the pictured example, a client process running on CPU 28 invokes an RDMA compress-and-write command for execution by NIC 32. Specifically, assuming NIC 32 to be an IB HCA, the client process may submit a suitable work request, which causes a corresponding WQE to be placed in the appropriate send queue for execution by the NIC. The WQE specifies a source buffer 46 in memory 30 and a target address 48 in memory 40. When the WQE reaches the head of the queue, NIC 32 executes the RDMA command by reading buffer 46, compressing the data from the buffer, and transmitting the compressed data in one or more RDMA packets via network 26 to host 24. Upon receiving the packets, NIC writes the compressed payload data to target address 48, which is identified by information in the packet header.

As illustrated in FIG. 1, the buffer receiving the data at target address 48 is normally considerably smaller than source buffer 46. (The stronger the compression, the smaller will be the target buffer.) This reduction in data size results in lower latency of data transfer, higher effective data bandwidth on the network and on the receiver bus, and smaller space consumption in memory 40 at node 24.

Figure 2:
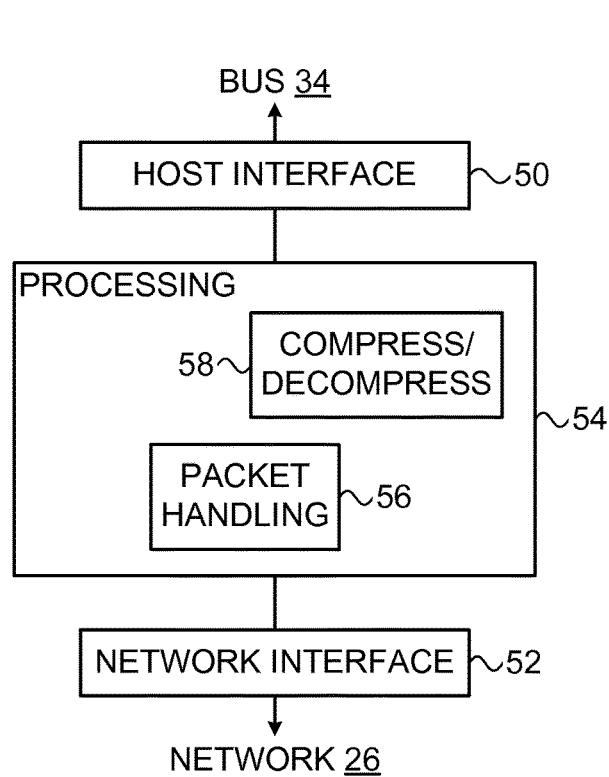
FIG. 2 is a block diagram that schematically shows elements of a NIC, in accordance with an embodiment of the present invention.

FIG. 2 is a block diagram that schematically shows elements of NIC 32, in accordance with an embodiment of the present invention. NIC 32 comprises a host interface 50, which connects to CPU 28 and memory 30 via bus 34, and a network interface 52, which is coupled to network 26. Processing circuitry 54, coupled between host interface 50 and network interface 52, comprises packet handling circuits 56, which generate outgoing packets for transmission over network 26 and process incoming packets received from the network. Interfaces 50 and 52 and circuitry 54 typically comprise dedicated hardware logic, whose details will be apparent to those skilled in the art after reading the present description. Alternatively or additionally, at least some of the functions of circuitry 54 may be implemented in software on a suitable embedded processor.

When processing circuitry 54 receives a WQE that invokes an RDMA compress-and-write or RDMA read-and-decompress operation, the corresponding compression or decompression operation is carried out by a compression engine 58 within the processing circuitry of NIC 32. The data to be compressed are read from memory 22, or the decompressed data are written to memory 22, via host interface 50 by a suitable DMA operation over bus 34. Compression engine 58 cooperates with packet handling circuits 56 to compress data before packetization and transmission, as well as to decompress compressed data that is extracted from the payloads of incoming packets.

Alternatively or additionally, a WQE may invoke an RDMA compress-and-write or RDMA read-and-decompress operation in which both the source buffer and the target address are in local memory 30. In this case, both data input to compression engine 58 and data output from the compression engine take place by DMA from and to memory 30 via host interface 50. A special QP may be dedicated to this sort of "local RDMA" operation.

As noted above, compression engine 58 typically comprises suitable hardware logic circuits for carrying out the appropriate compression or decompression algorithm. The compression engine may be adapted for one particular compression algorithm or for two or more different algorithms, which may be invoked by submitting appropriate work items to corresponding work queues. For instance, the compression engine may be configured for both lossless and lossy compression, as well as for different lossless and/or lossy compression algorithms (such as Lempel-Ziv, Huffman, and predictive types of lossless algorithms). Various sorts of hardware compression and decompression accelerators are known in the art for such purposes and may be adapted for incorporation in compression engine 58. By way of example, U.S. Pat. No. 7,051,126 describes a compression system that includes multiple hardware compressors, which could be integrated, mutatis mutandis, into compression engine 58.

NIC 32 may offer its compression/decompression facilities to host 22 as part of its advertisement of overall offload capabilities. Client processes may then specify the desired compression algorithm and parameters in WQEs that they submit to the NIC (and correspondingly, the CQEs generated by the NIC may indicate what algorithm was used). Different applications may have different data patterns, and it is thus advantageous to allow the user to choose the method of compression that is best suited for the application data. Additionally or alternatively, the NIC may analyze the data and/or application requirements in order to choose the optimal compression method automatically.

Figure 3:
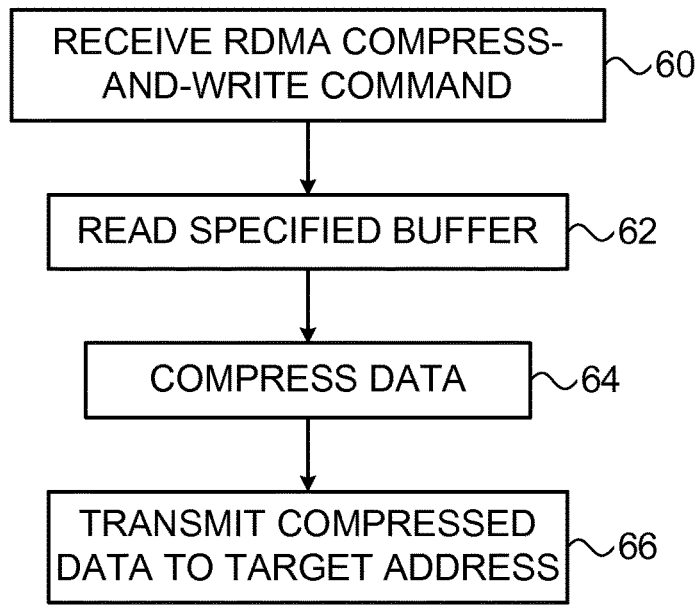
FIG. 3 is a flow chart that schematically illustrates a method for data compression carried out by a NIC, in accordance with an embodiment of the present invention.

FIG. 3 is a flow chart that schematically illustrates a method for data compression carried out by NIC 32, in accordance with an embodiment of the present invention. The method is invoked when the NIC receives an RDMA compress-and-write command, at a command input step 60. As explained earlier, this command may be in the form of a WQE, which specifies the source buffer, target address, and operation to be carried out. Alternatively, other sorts of command formats may be used to invoke the operation, depending on the system architecture and protocols. It is assumed in this example that the command specifies data to be conveyed, in compressed form, from local host memory 30 (of host 22) to remote memory 40 (of host 24).

In response to the command, processing circuitry 54 reads the specified buffer 46 from memory 30 and passes the data in the buffer to compression engine 58, at a buffer reading step 62. The compression engine 58 compresses the data, using the appropriate compression algorithm, at a data compression step 64. Typically, the data compression is carried out on the fly, as the data are read in from memory 30, to avoid having to buffer a large amount of data in NIC 32. As compression engine 58 compresses the data, it passes the compressed data to packet handling circuits 56. These circuits compose the required packet headers, specifying target address 48 and the appropriate source and target QP information, and insert the compressed data in the packet payloads. Circuits 56 then transmit the packets via network interface 52 over network 26 to host 24, at a data transmission step 66. NIC 42 receives the packets and writes the data to the specified target address 48 in memory 40.

Figure 4:
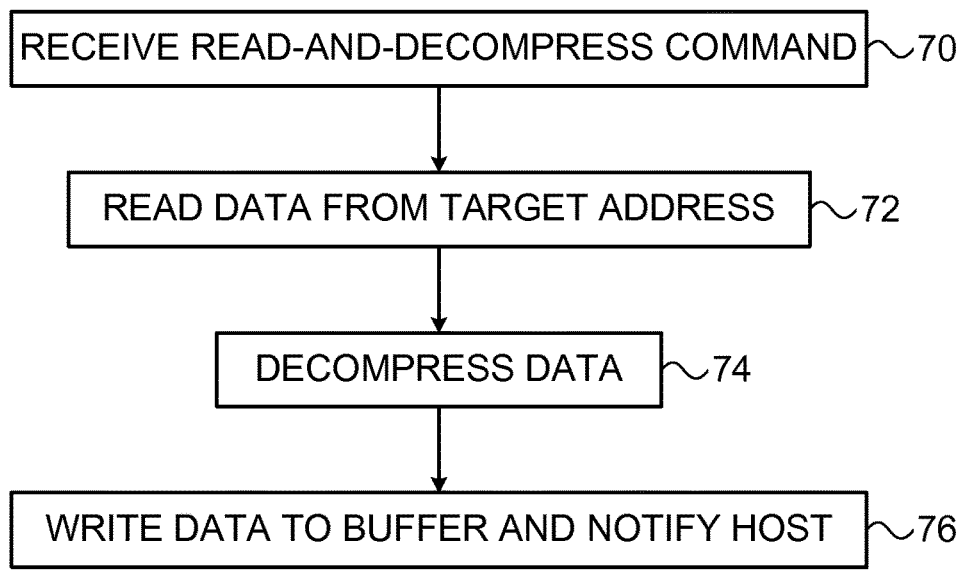
FIG. 4 is a flow chart that schematically illustrates a method for data decompression carried out by a NIC, in accordance with an embodiment of the present invention.

FIG. 4 is a flow chart that schematically illustrates a method for data decompression carried out by a NIC, in accordance with an embodiment of the present invention. In this case, it will be assumed that the method is carried out by NIC 42 after receiving the compressed data transmitted at step 66 above. Typically, NIC 42 notifies the appropriate client (as identified by the target QP in the packet headers) running on CPU 38 that new data have arrived, either by raising an appropriate interrupt or by responding to polling by the CPU, for example. The client may determine that the data at target address 48 are compressed either on the basis of the target QP number or by actually reading a part of the data.

To cause NIC 42 to decompress the data, the client running on CPU 38 submits an RDMA read-and-decompress command (again, typically in the form of a WQE), which is received by NIC 42 at a command input step 70. The command specifies a source buffer, located at target address 48, and a new target address to which the decompressed data should be written in memory 40. In response to the command, NIC 42 reads in the compressed data from target address 48, at a data input step 72, and passes the data to its own embedded compression engine for decompression, at a data decompression step 74. NIC 42 then writes the decompressed data to a buffer at the specified new target address in memory 40, at a data writing step 76. The NIC may notify the client that decompression has been completed by writing a CQE to the appropriate completion queue in memory 40, for example, as well as raising an interrupt or responding to a polling request if appropriate.

Alternatively, a RDMA read-and-decompress command may specify a source buffer containing compressed data in the memory of a remote node. The NIC receiving such a command will carry out an RDMA read operation to retrieve the compressed data in one or more data packets from the remote node, following which the NIC will decompress and write the data to a specified target address in the local host memory. Other variations on the schemes outlined above will be apparent to those skilled in the art after reading the above description and are considered to be within the scope of the present invention. Although the embodiments described above refer specifically to a NIC, the principles of the present invention may similarly be applied in I/O devices of other types.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for compression, comprising:

submitting by a client process running on a host processor, which has a local host memory, a work request for performing compression by a network interface controller (NIC) connected to the host processor by a local bus, wherein the NIC connects the host processor to a network, and is configured to receive both transmission and compression work elements, including transmission-only work elements, which do not require compression, and compression-only work elements, which do not require transmission to a remote node;

placing a corresponding work element in a work queue, responsive to the submitted work request, the work element specifying a source memory buffer in the local host memory from which data referred to by the corresponding work element is to be read and a target memory address, in which the data referred to by the corresponding work element is to be stored compressed;

receiving work elements, by the NIC, from the work queue, each work element specifying a source memory buffer, a target memory address and an operation; and for each received work element, reading data referred to by the received work element from the specified source memory buffer in the local host memory into the NIC, and performing the specified operation on the data that was read, wherein performing the specified operation for each received work element comprises, for one or more work elements in which the specified operation is compression, compressing data referred to by the one or more work elements in the NIC, and storing the compressed data from the NIC to the target memory address, and for one or more work elements in which the specified operation is transmission, loading data referred to by the one or more work elements into packets and transmitting the packets over the network.

2. A method for communication, comprising:

submitting by a client process running on a host processor, which has a local host memory, a work request for performing decompression by a network interface controller (NIC) connected to the host processor by a local bus, wherein the NIC connects the host processor to a network, and is configured to receive both transmission and decompression work elements, including transmission-only work elements, which do not require decompression, and decompression-only work elements, which do not require transmission to a remote node;

placing a corresponding work element in a work queue, responsive to the submitted work request, the work element specifying a source memory buffer containing compressed data and a target memory address in the local host memory;

receiving work elements, by the NIC, from the work queue, each work element specifying a source memory buffer, a target memory address and an operation; and for each received work element, reading compressed data from the specified source memory buffer into the NIC, and performing the specified operation on the compressed data from the specified source memory buffer, wherein performing the specified operation for each received work element comprises, for one or more work elements in which the specified operation is decompression, decompressing compressed data referred to by the one or more work elements in the NIC, and conveying the decompressed data from the NIC to the target memory address in the local host memory, and for one or more work elements in which the specified operation is transmission, loading data referred to by the one or more work elements into packets and transmitting the packets over the network.

3. A network interface controller (NIC), comprising:

a network interface, configured to transmit and receive data packets over a network;

a host interface, configured to be connected via a local bus to a host processor and a local host memory of the host processor; and processing circuitry, which is coupled between the network interface and the host interface and is configured to receive, via the host interface, work element commands in a queue, the work element commands including both transmission commands and compression commands, including transmission-only commands, which do not require compression, and compression-only commands, which do not require transmission to a remote node, which commands specify a source memory buffer in the local host memory, a target memory address and an operation, wherein in response to the work element command in the work queue being identified as a compress-and-write command, the processing circuitry is configured to read data from the specified source memory buffer in the local host memory, to compress the data, and to store the compressed data to the target memory address, and for work elements in which the specified operation includes transmission, the processing circuitry is configured to load data from the source memory buffer into packets and transmit the packets over the network.

4. The NIC according to claim 3, wherein the processing circuitry is configured to receive, via the host interface, a work element including a read-and-decompress command, specifying a further source memory buffer containing further compressed data and a further target memory address in the local host memory, and in response to the command, to read the further compressed data from the further source memory buffer, to decompress the further compressed data, and to convey the decompressed data to the further target memory address in the local host memory.

5. The NIC according to claim 4, wherein the further source memory buffer is in the local host memory of the host processor.

6. The NIC according to claim 4, wherein the further source memory buffer is in a remote host memory of a remote network node, and wherein the read-and-decompress command causes the processing circuitry to receive the further compressed data via the network interface from one or more data packets transmitted over the network from the remote network node.

7. The NIC according to claim 3, wherein the processing circuitry is configured to compress the data using a lossy compression algorithm.

8. The NIC according to claim 3, wherein the processing circuitry is configured to execute both read and write commands which do not involve compression, and compress-and-write and read-and-decompress commands.

9. The NIC according to claim 3, wherein the processing circuitry supports two or more different compression algorithms, and is configured to determine in response to a compress-and-write command a compression algorithm, from the two or more different algorithms, and to use the determined compression algorithm in compressing the data from the specified source memory buffer.

10. The NIC according to claim 9, wherein the processing circuitry is configured to determine the compression algorithm to be used based on an indication of a desired compression algorithm in the work element in the work queue.

11. The method according to claim 1, wherein compressing the data in the NIC comprises compressing in accordance with a lossy compression algorithm.

12. The method according to claim 1, comprising determining a compression algorithm, from two or more different compression algorithms supported by the NIC, to be used for data in the memory buffer specified by the command, based on an indication in the work element and wherein compressing the data in the NIC comprises compressing in accordance with the determined compression algorithm.

13. The method according to claim 2, wherein decompressing the compressed data in the NIC comprises decompressing using a method corresponding to a lossy compression algorithm.

14. The method according to claim 1, wherein conveying the compressed data from the NIC to the target memory address comprises conveying the compressed data in packets including headers indicating source and target queue pair (QP) information.

15. The method according to claim 1, further comprising receiving in the NIC a read-and-decompress command, specifying a further source memory buffer containing further compressed data and a further target memory address in the local host memory, and in response to the command, reading the further compressed data from the further source memory buffer, to decompress the further compressed data, and to convey the decompressed data to the further target memory address in the local host memory.

16. The method according to claim 15, wherein the further source memory buffer is in a remote host memory of a remote network node, and wherein reading the further compressed data comprises receiving the further compressed data in the NIC, through a network interface of the NIC, in one or more data packets transmitted from the remote network node.

17. The method according to claim 1, wherein the NIC is connected to the host processor and the local host memory through a peripheral connection bus.

* * * * *